United States Patent [19]
Ikeo et al.

[11] Patent Number: 5,566,289
[45] Date of Patent: Oct. 15, 1996

[54] DOCUMENT FORMATTING SUPPORT SYSTEM

[75] Inventors: Joji Ikeo; Tsuyoshi Tanaka, both of Yokohama, Japan

[73] Assignee: Fuji Xerox Co., Ltd., Japan

[21] Appl. No.: 519,617

[22] Filed: Aug. 24, 1995

Related U.S. Application Data

[63] Continuation of Ser. No. 960,133, Oct. 13, 1992, abandoned.

[30] Foreign Application Priority Data

Oct. 17, 1991 [JP] Japan .................................. 3-269601

[51] Int. Cl.⁶ ...................................................... G06F 15/00
[52] U.S. Cl. .......................................................... 395/148
[58] Field of Search ...................................... 395/144–149

[56] References Cited

U.S. PATENT DOCUMENTS

| | | | |
|---|---|---|---|
| 4,813,010 | 3/1989 | Okamoto et al. | 364/900 |
| 4,876,665 | 10/1989 | Iwai et al. | 364/900 |
| 4,970,665 | 11/1990 | Doi et al. | 395/148 |
| 5,043,891 | 8/1991 | Goldstein et al. | 364/419.1 |
| 5,179,650 | 1/1993 | Fukui et al. | 395/148 |
| 5,263,132 | 11/1993 | Parker et al. | 395/146 |
| 5,333,237 | 7/1994 | Stefanopoulos et al. | 395/12 |
| 5,341,469 | 8/1994 | Rossberg et al. | 395/145 |

FOREIGN PATENT DOCUMENTS

| | | |
|---|---|---|
| 62-229364 | 10/1987 | Japan . |
| 62-175965 | 7/1988 | Japan . |
| 1180062 | 7/1989 | Japan . |
| 1304575 | 12/1989 | Japan . |

OTHER PUBLICATIONS

L. Lamport, "LATEX: A Document Preparation System", Addison–Wesley (1985).

F. Hayer–Roth et al.,"Building Expert Systems", Addison–Wesley (1983).

Fuji Xerox, "Presentation & Documentation", Compiled by Fuji Xerox (1989), (Japanese Version).

"A Study on Evaluation Scales for Document Design Quality" reported in Proceedings of the 42nd General Meeting of the Information Processing Society of Japan, 1991. (Japanese Version).

*Primary Examiner*—Heather R. Herndon
*Assistant Examiner*—Joseph R. Burwell
*Attorney, Agent, or Firm*—Welsh & Katz, Ltd.

[57] ABSTRACT

A document style design support system which enables a system user to easily prepare a format design for a document meeting his purpose and application while eliminating the need to have any editorial design knowledge and which also enables the system user to easily design a format for a document satisfying his intention and application even when the system user has no prior document style design experience. In the document style design support system, an inferring operation is carried out with use of such document style design knowledge data including document evaluation words and document attributes and document style design elements to decide an optimum style format. Further, an inferring operation is carried out with use of document style design knowledge data including document evaluation words and document style formatting methods to extract the optimum document style formatting method.

11 Claims, 10 Drawing Sheets

FIG.1

```
(RULE00100
   (IF
      (==($GET "DOCUMENT TYPE")
        "IN-HOUSE TECHNICAL DOCUMENT")
   THEN
      (&PUT "DOCUMENT PAPER SIZE" "A4
            PORTRAIT")
      ($PUT "DOCUMENT TYPE-SETTING"
            "LATERAL TYPE-SETTING")
   )
)
```

[IN-HOUSE TECHNICAL DOCUMENT IS OF A4 PORTRAIT AND LATERAL TYPE-SETTING]

FIG.2

```
(RULE00200
   (IF
      (==($GET "DOCUMENT PAPER SIZE")
            "A4 PORTRAIT")
      (==($GET "DOCUMENT TYPE-SETTING")
            "LATERAL TYPE-SETTING")
      (>=($GET "DOCUMENT PURPOSE/IMPRESSION
                     READABILITY")
         4 )

(>=($GET "DOCUMENT PURPOSE/IMPRESSION
                     ATTRACTIVITY")
         4 )
   THEN
      ($PUT "DOCUMENT BASIC LAYOUT PRINTING
            FACE LEFT MARGIN"90)

($PUT "DOCUMENT BASIC LAYOUT PRINTING
            FACE RIGHT MARGIN"20)

($PUT "DOCUMENT BASIC LAYOUT COLUMN
                  NUMBER"1)

)
)
```

[DOCUMENT WITH READABILITY 4 OR MORE AND ATTRACTIVITY 4 OR MORE IS SET TO HAVE LEFT MARGIN 90mm AND RIGHT MARGIN 20mm]

```
DOCUMENT TYPE = IN-HOUSE TECHNICAL DOCUMENT ;
DOCUMENT IMPRESSION/PURPOSE READABILITY = 4;
DOCUMENT IMPRESSION/PURPOSE GIST CLEARNESS =4;
DOCUMENT IMPRESSION/PURPOSE ATTRACTIVITY =4;
DOCUMENT IMPRESSION/PURPOSE FORMALITY =4;
    .
    .
    .
    .
```

FIG. 5

BASIC LAYOUT

| | |
|---|---|
| PAGE SIZE : | A4 PORTRAIT |
| TYPE SETTING : | LATERAL |
| COLUMN NUMBER : | 1 |
| COLUMN INTERVAL : | - - - |
| SPREAD : | SINGLE FACE |
| TOP MARGIN : | 35 mm |
| BOTTOM MARGIN : | 20 mm |
| LEFT MARGIN : | 90 mm |
| RIGHT MARGIN : | 20 mm |
| CHARACTER SIZE : | 10 POINTS |
| TYPEFACE : | MINCHO |
| CHARACTER PITCH : | SOLID SETTING |
| LINE PITCH : | 18 POINTS |

BANNER HEADLINE (TITLE)

| | |
|---|---|
| CHARACTER SIZE : | 14 POINTS |
| TYPEFACE : | GOTHIC |
| CHARACTER PITCH : | SOLID SETTING |
| LINE PITCH : | 21 POINTS |
| OFFSET LEFT : | 0 POINT |
| OFFSET RIGHT : | 0 POINT |
| OFFSET UPPER : | 0 POINT |
| OFFSET LOWER : | 21 POINTS |
| LINE JUSTIFICATION : | LEFT JUSTIFICATION |

```
(RULE00100
   (IF
      ($MEMBER($GET  "INQUIRY  ITEM")
         "PRINTING FACE SETTING")
      (==($GET  "DOCUMENT  TYPE")
         "OHP  MATERIAL")
      (>=($GET  "DOCUMENT  PURPOSE/IMPRESSION  READABILITY")
         3)
   THEN
      ($DISPLAY "DOCUMENT  PRINTING  FACE  HEIGHT"  "<=200")
      ($DISPLAY "DOCUMENT  PRINTING  FACE  WIDTH"   "<=200")
   )
)
```

[THE HEIGHT AND WIDTH OF PRINTING FACE ARE SET TO BE 200mm OR LESS FOR READABLE OHP MATERIAL]

FIG. 10

```
(RULE00200
   (IF
     ($MEMBER ($GET "INQUIRY ITEM")
         "CHARACTER SIZE SETTING")
     (==($GET "DOCUMENT TYPE")
         "OHP MATERIAL")
     (>=($GET "DOCUMENT PURPOSE/IMPRESSION READABILITY")
         3)
   THEN
     ($DISPLAY "DOCUMENT TEXT CHARACTER
            TYPEFACE SIZE" ">=12")
   )
)
```

[FOR IMPROVING TOO SMALL CHARACTER IN OHP MATERIAL. THE SMALLEST CHARACTER (TEXT) IS SET TO BE 12 POINTS IF READABILITY IS DESIRED]

FIG. 11

DOCUMENT TYPE = "OHP MATERIAL" ;

DOCUMENT PURPOSE/IMPRESSION READABILITY =4;

DOCUMENT PURPOSE/IMPRESSION GIST CLEARNESS = 4;

DOCUMENT PURPOSE/IMPRESSION ATTRACTIVITY =5;

DOCUMENT PURPOSE/IMPRESSION FORMALITY =4:

FIG. 12

```
INQUIRY ITEM=(PRINTING FACE SETTING
              CHARACTER SIZE SETTING);
```

FIG.13

```
INQUIRY ITEM : PRINTING FACE SETTING

PRINTING FACE HEIGHT :  200mm OR LESS
PRINTING FACE WIDTH  :  200mm OR LESS

**INQUIRY ITEM : CHARACTER SIZE SETTING **
TEXT CHARACTER TYPEFACE SIZE : 12 POINTS OR MORE
```

DOCUMENT FORMATTING SUPPORT SYSTEM

This is a continuation application of Ser. No. 07/960,133 filed Oct. 13,1992 abandoned.

BACKGROUND OF THE INVENTION

1. Field of the Invention

The present invention relates to a document preparation support system which supports document style design and more particularly, to a document style design support system which effectively supports document style design preparer based on document style design knowledge according to user's preference.

2. Description of the Related Art

In preparing a document, generally speaking, preparation of a document from its very beginning imposes a considerable amount of labor on a document preparer or user. This is because, in preparation of the document, he must decide not only the contents itself of the document but also, e.g., the layout of the document, the size and typeface of characters in the document which determine the design of the finished document. Further, when the user is required to select one of combinations of colors when it is desired to design the document style of a colored document, in particular, the ordinary user usually cannot select a suitable color combination.

For this reason, when it is desired to get a good-looking document satisfying user's intention and application, it has been conventional that the document user asks a document design expert known as an editorial designer the preparation of the document, or the document user prepares the document by himself while holding a consultation with the editorial designer. However, the request of the document preparation to the editorial designer generally involves a lot of cost and time. For this reason, only limited types of documents have been requested of the editorial designers in actual circumstances.

Meanwhile, there have been proposed techniques for supporting preparer's document preparation to produce a good document based on word processors or desk top publishing (DTP) systems. A major one of such techniques is to accumulate good-looking documents which have been so far prepared and help a document preparer to re-use them, that is, to support preparer's document preparation. For example, Japanese Patent Application Laid-Open No. 63-175965 and Japanese Patent Application Laid-Open No. 1-304575 disclose a document processing system in which documents are previously classified and accumulated depending on different applications and one of the accumulated documents having the similar properties to a desired new document to be prepared is selected and for its re-use. In a document format applying method having document style design contents previously stored is one technique. On the other hand, one of a plurality of previously-prepared document formats may be selected and parameters of the selected document format may be applied to a document to be newly prepared for document design to obtain a good-looking new document output. An example embodying this method is such a system as a LaTex (L. Lamport, LATEX: A Document Preparation System, Addison-Wesley, 1985) which is used as a document formatter. There has also been proposed a document editing system which analyzes the logical structure of a document and on the analysis result, selects and applies a suitable format, as disclosed in Japanese Patent Application Laid-Open No. 62-229364 and Japanese Patent Application Laid-Open No. 1-180062.

However, in the method for re-using past documents, the more the document examples to be selected are the more difficult it is for an ordinary document preparer having no design knowledge to select one of the examples meeting his intention and application. Further, the less the document examples to be selected are the less the possibility of selecting one of the examples satisfying his intention and application is, which leads to the fact that the document selection itself sometimes becomes meaningless. Furthermore, when the user cannot understand the system so that he cannot recognize to such an extent that part in the document example which reflects his intention and application, he cannot select the part in the document example to be re-used. Accordingly, ordinary document users could use the system only at the time of the preparation of such regular form documents as business letters.

Meanwhile, even in the document-format applying method, so long as the selection of a document format is right, a certain level of quality of document can be obtained. However, as in the method for re-using the past documents, when the document preparer cannot understand the system to select that part in the finished document obtained through the format application which best reflects his intention and application, he cannot correct improper points generated under the inherent conditions of the document or improper points caused by the unsuitable selection of the format in the finished document. Accordingly, ordinary document users could not obtain always a desired document. This method also has the problem that the more formats to be selected are prepared the more difficult it is for the document preparer to judge; while the less formats to be selected result in a lesser possibility of selecting one of the formats satisfying his intention and application.

Both methods have had the problem that even when the ordinary system user having no design knowledge tries to modify and correct the selected document, he does not know how to copy which parts of the past-prepared or previously-prepared document and to correct which parts thereof to reflect his intention and application on a document, so that he cannot make full use of the existing documents and formats properly, which results in that he cannot obtain a certain quality of or higher quality of designed documents unless he prepares the document while holding a consultation with a design expert.

SUMMARY OF THE INVENTION

It is an object of the present invention to provide a document style design support system which can support document style design and produce a finished document satisfying user's intention and application, while eliminating the need for user's having such knowledge as editorial design.

Another object of the present invention is to provide a document style design support system which can design document style and produce a finished document satisfying a user's intention and application, while eliminating the need for the user having such document style design knowledge.

In accordance with a document style design support system of a first invention, when a system user enters the values of such attributes as impression and purpose to be applied to a document being prepared and document type through an input means, these data are held in input data memory means. When a user's indication signal issued from the input means causes document style design deciding means to be activated, the document style design deciding means decides a document style design with use of data stored in a knowledge database while making reference to the contents of the input data memory means having degrees of evaluation words for the user's desirable impression or purpose and the values of attributes of the document being prepared held therein, and the document style design deciding means outputs the decided result to output means.

The document style design deciding means, when finding lack data necessary in the decision of the document style design, informs inquiry means of the lack data. The inquiry means, on the basis of a notification from the document style design deciding means, issues an inquiry of the lack data to the output means in a question form. The inquiry means, when receiving a response from the user through the input means, adds the response to the input data memory means as data.

Further, when the document style design deciding means makes reference to the contents of the knowledge database, knowledge database selector means selects a suitable knowledge database while making reference to the contents of the input data memory means. The document style design deciding means makes reference to the contents of the selected knowledge database and decides a document style design.

In accordance with a document style design support system of a second invention, when a system user enters the values of such attributes as impression and purpose to be applied to a document being prepared and document type through input means, these data are held in input data memory means. When a user's indication signal issued from the input means causes a document style design method extractor means to be activated, the document style design method extractor means extracts a document style design method with use of data stored in a knowledge database while making reference to the contents of the input data memory means having degrees of evaluation words for the user's desired impression or purpose and the values of attributes of the document being prepared held therein, and outputs the extracted result to output means.

The document style design method extractor means, when finding a lack of data necessary in the extraction of the document style design method, informs inquiry means of the lack of data. The inquiry means, on the basis of a notification from the document style design method extractor means, issues an inquiry of the lack of data to the output means in a question form. The inquiry means, when receiving a response from the user through the input means, adds the response to the input data memory means as data.

Further, when the document style design method extractor means makes reference to the contents of the knowledge database, knowledge database selector means selects a suitable knowledge database while making reference to the contents of the input data memory means. The document style design method extractor means makes reference to the contents of the selected knowledge database and extracts a document style design method.

DESCRIPTION OF THE PREFERRED EMBODIMENTS

A document style design support system in accordance with an embodiment of the present invention will be detailed with reference to the attached drawings.

First of all, a first embodiment of the document style design support system of the present invention will be explained by referring to FIGS. 1 to 8.

Figure 1:
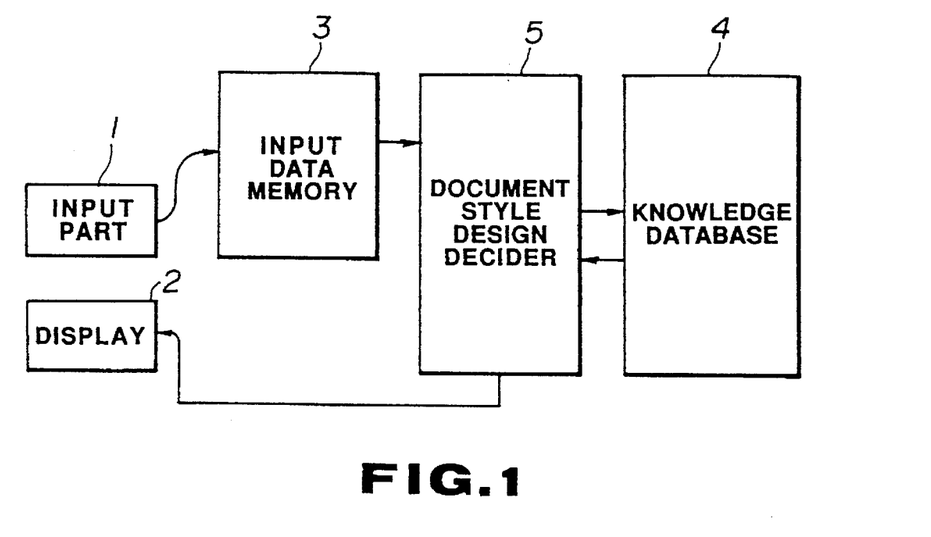
FIG. 1 is a block diagram of a document style design support system in accordance with a first embodiment of a first invention.

Referring first to FIG. 1, there is shown a block diagram of the document style design support system of the first embodiment, which includes an input part 1, a display 2, an input data memory 3, a knowledge database 4 and a document style design decider 5.

The input part 1, which comprises, for example, a keyboard, a mouse, a joy-stick or a touchpanel, is used to enter various sorts of data and commands therethrough.

The display 2 is such a device as a display unit or a printer which displays or outputs characters, figures, messages, etc.

The input data memory 3, which comprises, for example, a magnetic disk unit or a main memory, stores therein data entered through the input part 1. The input data memory 3 stores therein the input data in such a form as to be accessible on these memory devices to provide data to the user in response to user's inquiry. For example, when the user wishes to know a preference degree for the "formality" entered by the user, the input data memory 3, when receiving an inquiry of e.g., "document purpose/impression. formality", can output data of "3" out of 5 levels of formality. Further, when he wishes to know the type of a document being prepared, an inquiry of "document. type" results in acquisition of data "in-house technical document".

The knowledge database 4, which comprises a magnetic disk device or an optical disk device, stores therein, as document style design knowledge data, evaluation words indicative of the purpose/impression of a document, document style design elements as document structure parameters including paper size, printing face size and character size, document attributes such as document type, purpose and finish impression, and document style design data knowledge for prescribing relationships between these evaluation words, document design elements and document attributes, by such a knowledge representation method as an "IF- THEN" rule type or a frame type.

The document style design decider 5, which comprises an inference engine for drawing such an inference as forward or backward reasoning, decides the optimum design of the document style with use of the data of the knowledge database 4 on the basis of the document data stored in the input data memory 3.

Figure 2:
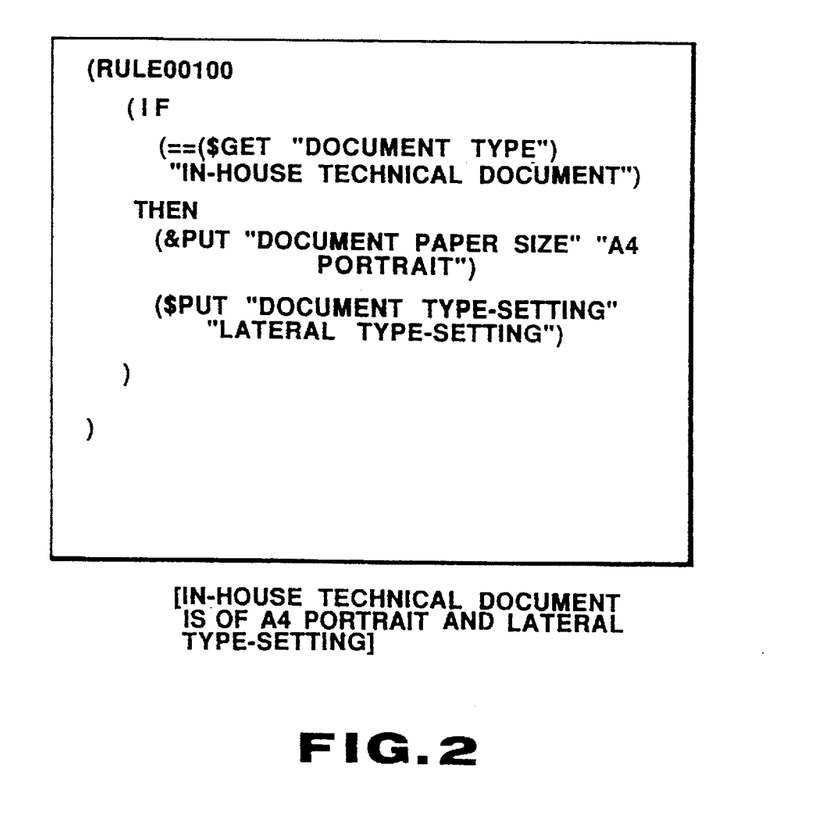
FIG. 2 is an example of a knowledge representation in a knowledge database.
Figure 3:
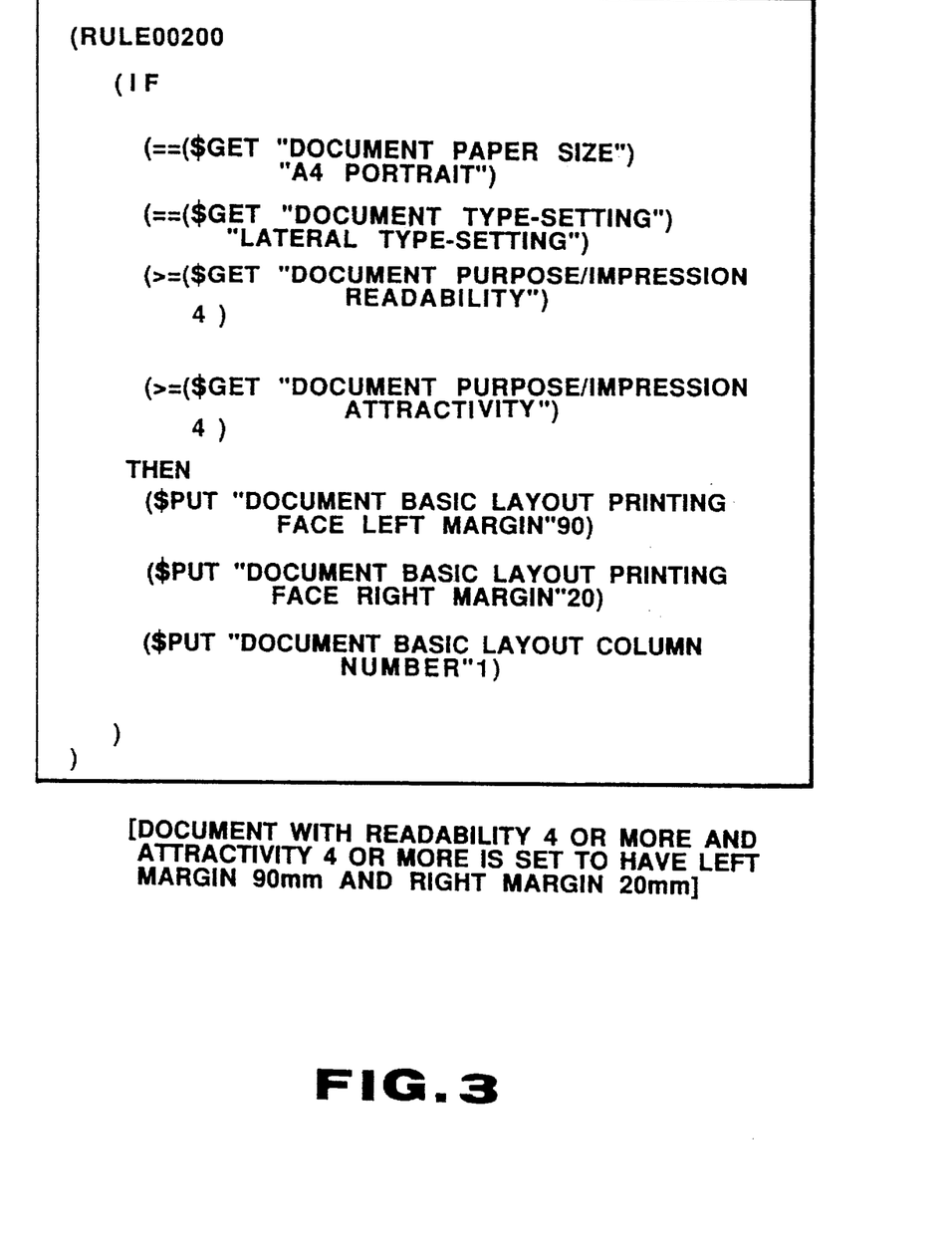
FIG. 3 is another example of the knowledge representation in the knowledge database.

The knowledge representation method and the structure of the inference engine in a general knowledge data base are explained in detail, for example, in a book entitled "Building Expert System", written by F. Hayes-Roth, et al., Addison-Wesley, 1983. In this connection, the word "knowledge on document design" as used herein refers to various knowledge necessary for deciding the document design including quantitative data obtained by such a subjective evaluation method as mentioned, e.g., in a paper entitled "A Study on Evaluation Scales for Document Design Quality" reported in Proceedings of the 42-nd General Meeting of the Information Processing Society of Japan, 7Q-7, 1991, such qualitative or quantitative data as mentioned in a book entitled "Presentation & Documentation", compiled by Fuji Xerox, Fuji Xerox, 1989, and such data as indicative of house instructions in companies. In more detail, for example, such knowledge that "an in-house technical document is of A4 portrait and lateral type-setting" is expressed in such a form as shown in FIG. 2, and such knowledge that "an attractive and readable document is set to have a left margin 90 mm and a right margin 20 mm" is expressed in such a form as shown in FIG. 3.

Now explanation will be made as to the operational procedure of an inference mechanism in the document style design decider 5 by referring to a flowchart of FIG. 4.

The document style design decider 5, when receiving an instruction indicative of the inference start, extracts all the rules written in the IF-THEN format from the knowledge database 4 through the motion of the inference engine and set the extracted rules as "rules" (step 101). Next, the document style design decider 5, on the basis of the data of the input data memory 3, finds all ones of the "rules" in which conditions written in IF condition parts are all true and sets the found rules as "Trules" (step 103). Then, the document style design decider 5 selects one of the "Trules" to execute the execution contents of the THEN execution part of the selected rule (step 105). The above rule selection and execution are repeated until an inference stop command is issued by the THEN execution part (step 102) or until the "Trules" becomes empty (step 104). As a result, the document style design decider 5 decides the document design meeting user's purpose and application.

Explanation will next be directed to a specific example when document preparation is actually supported by the aforementioned document style design support system.

Figure 5:
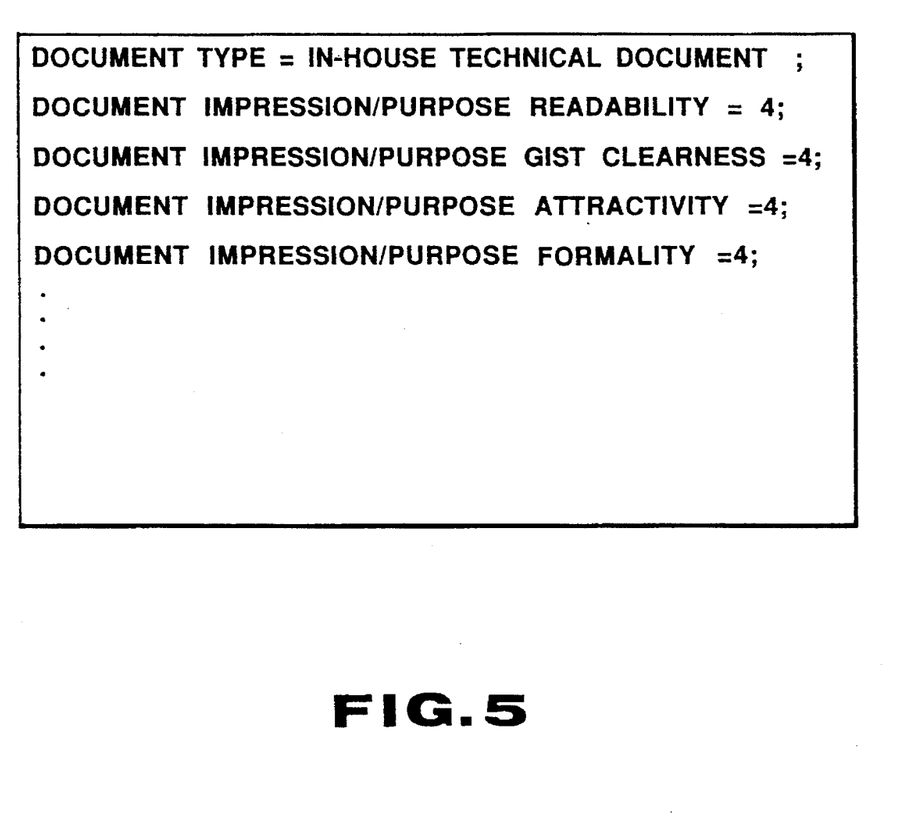
FIG. 5 is an example of data entered by a user.

First, when the user enters such data as shown in FIG. 5 through the input part 1, the input data memory 3 stores therein such data as "document type: in-house technical document", "purpose/impression: legibility or readability (4), gist clearness (4), attractivity (4), formality (4) . . .". In this example, the numbers following the respective evaluation word items in the "purpose/impression: . . ." indicate one of ranks 1, 2, 3, 4 and 5 (full mark: 5), that is, the degree of image (finish impression) to be provided to the resulting designed document as the purpose/impression.

Figure 4:
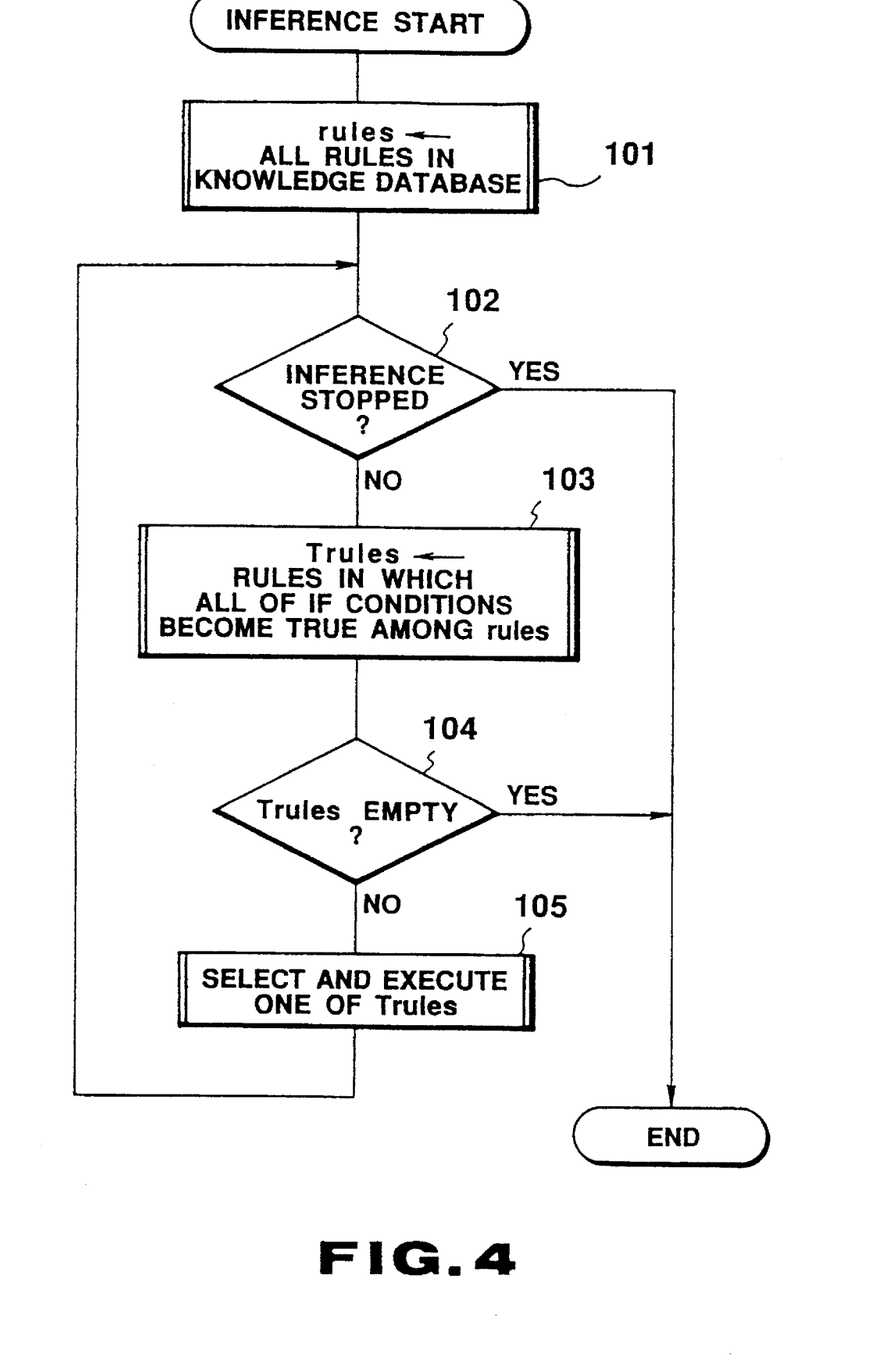
FIG. 4 is a flowchart for explaining the operational procedure of an inference mechanism in a document design decider.

The document style design decider 5 selects and executes such a rule as shown in FIG. 2 according to the operational procedure of FIG. 4 to decide a format of A4 portrait and lateral writing. This is a rule which is selected in the input data memory 3 on the basis of the data "document type: in-house technical document" because its IF conditional part becomes true. This means that, when in-house technical documents should have a format of A4 portrait and lateral writing according to the in-house instructions for example, such a rule is selected and determined. Similarly, the document style design decider 5 further selects and executes such a rule as shown in FIG. 3 on the basis of data indicative of the decision of the format of A4 portrait and lateral writing to decide the left and right margins of the printing sheet to the 90 mm and 20 mm respectively. This means that, for the purpose of drawing reader's attention to the in-house technical document of A4 portrait and lateral writing and avoiding reader's bad feeling with too many words in one sheet for example, it is desirable to set a sum of the left and right margins to be large and to shift the printed part rightward in the sheet to give the reader easy reading at the time of leafing the sheet. Similarly, since it is desired to provide a highly clear gist and understandability (high gist clearness), such document design is determined that the size of a subtitle is set to be 1.2 times the size of the document text (body) and the subtitle is projected leftward from the left end of the document text, and then necessary document style design parameters are determined, at which stage the inference is completed.

Figure 6:
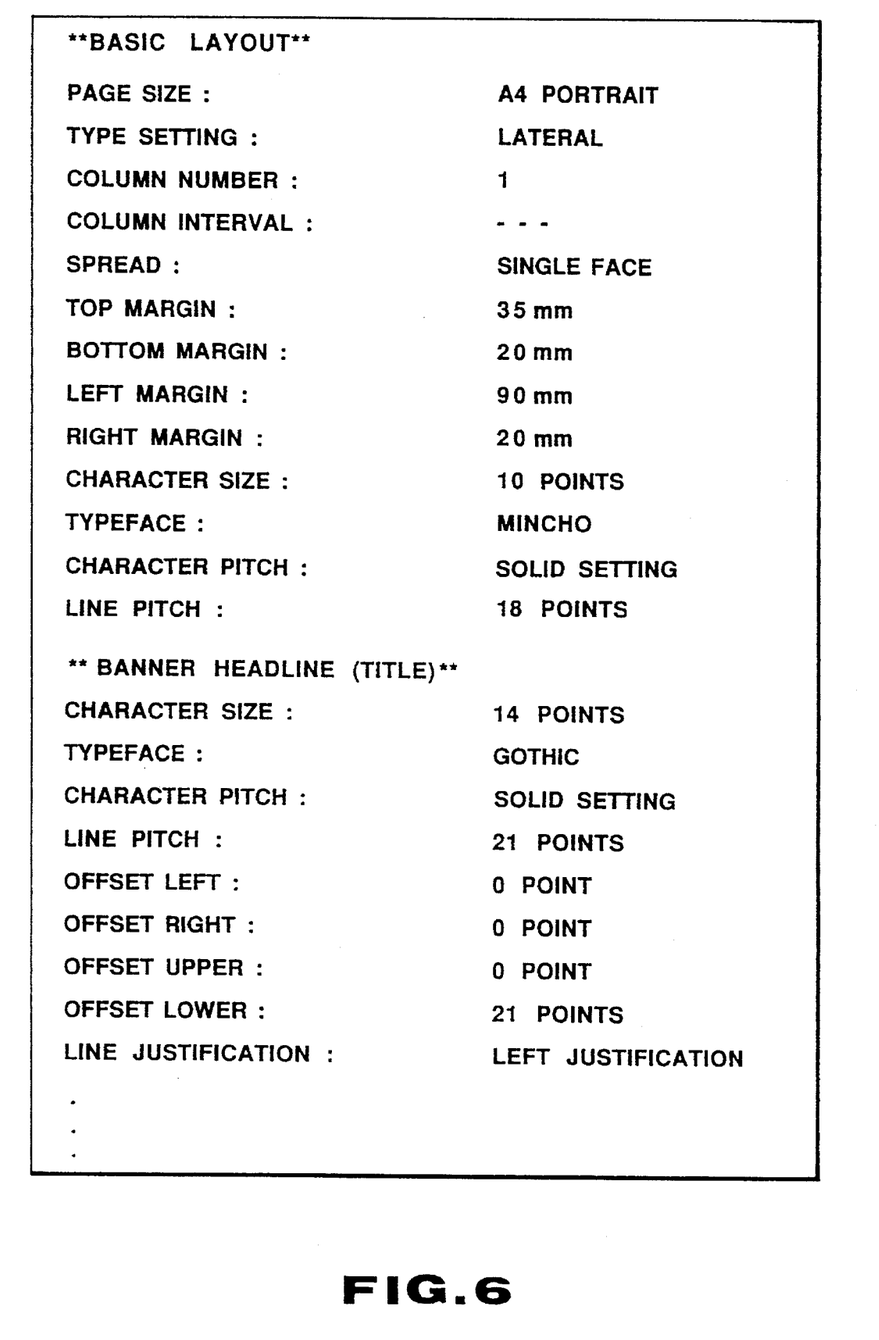
FIG. 6 is a display example of determined document style design parameters.

The values of the document style design parameters thus obtained are displayed on the display 2 in such a form as shown in FIG. 6 and the user can edit the document according to the values of the displayed document style design parameters. Although the values of the document style design parameters are listed in character strings in the illustrated example, A general example of the document prepared based on the values of the document style design parameters may be displayed.

Figure 7:
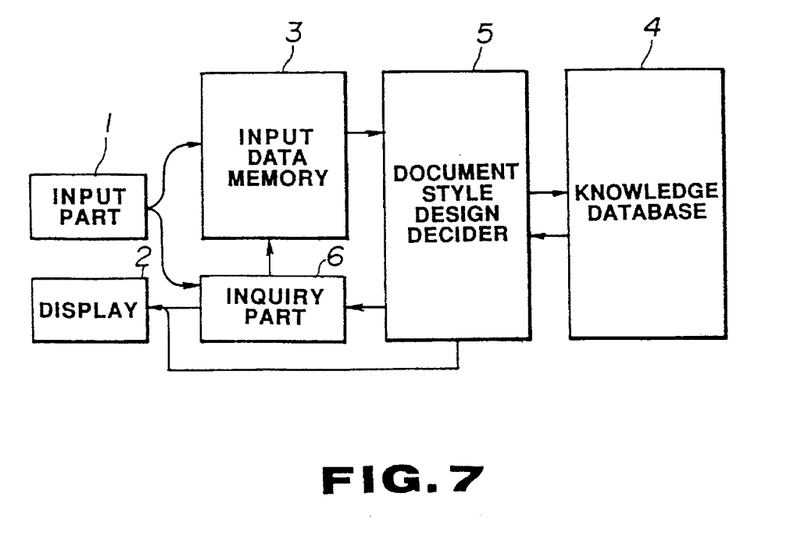
FIG. 7 is a block diagram of a document style design support system in accordance with a second embodiment of the first invention.

Explanation will next be made as to a second embodiment of the present invention. FIG. 7 shows a block diagram of a document style design support system in accordance with the second embodiment of the present invention. The document style design support system of FIG. 7 includes, in addition to the arrangement of FIG. 1, an inquiry part 6 having means (not shown) for displaying lack data necessary in the document style design decider 5 on the display 2 in a question sentence form and also having means (not shown) for receiving its response from the input part 1 and adding it to the input data memory 3.

In the present embodiment, when the document style design decider 5 inquires of the input data memory 3 about, e.g., "document type" and the associated data is not held in the input data memory 3, the input data memory 3 performs such operation as to return such a special value as "nil" to the document style design decider 5 therefrom. And the document style design decider 5, when receiving the "nil" from the input data memory 3, once interrupts its operation and moves the control to the inquiry part 6 to cause the document editor or user to enter the associated value into the input data memory 3, whereby the control is again returned to the document style design decider 5 to execute the interrupted operation. In other words, when the document style design decider 5 fails to find attribute data necessary for deciding the design, the document style design decider 5 informs the inquiry part 6 of the missing attribute data, whereby the missing data is displayed on the display 2 to tell the user about it. When the user enters the missing attribute data through the input part 1, he can create his intended document. In this way, the system user can inform the system of his intention and application by entering the missing attribute data into the input data memory 3 through the input part 1.

Figure 8:
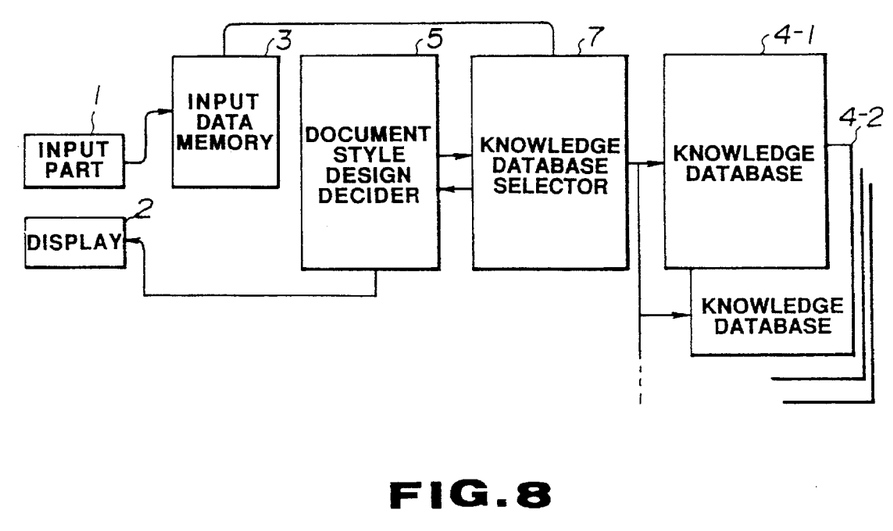
FIG. 8 is a block diagram of a document style design support system in accordance with a third embodiment of the first invention.

Next, a third embodiment of the invention will be explained. Referring to FIG. 8, there is shown a block diagram of a document style design support system in accordance with the third embodiment of the present invention. In the present document style design support system, the knowledge database 4 shown in the first and second embodiments is made up of a plurality of sub-databases prepared as classified based on the type, associated person, etc. of documents. Also held in the input data memory 3 is data for selecting one of the plurality of knowledge databases 4-1, 4-2, . . . so that a knowledge database selector 7 is provided for selecting one of the plurality of knowledge databases 4-1, 4-2, . . . on the basis of the data of the input data memory 3. Although the arrangement of FIG. 8 is based on the arrangement of FIG. 1, the arrangement of FIG. 8 may be similarly based on the arrangement of FIG. 7. Reference has been made to the single database in the foregoing first and second embodiments. In the present document style design support system, however, the knowledge database selector 7 selects associated one from the plurality of knowledge databases according to the attribute data of, e.g., the reader is an old man to retrieve the associated knowledge database. With such an arrangement, finer knowledge can be retrieved in a shorter time and thus the supporting effect can be enhanced. Further, since the knowledge database is divided into the plurality of sub-databases, specific one or ones of the plurality of sub-databases can be mounted on another system in some applications, whereby the database requiring a lot of labor and cost for its preparation and maintenance can be efficiently utilized.

Document style design support systems in accordance with embodiments of a second invention will be explained by referring to FIGS. 9 to 16.

Figures 9, 10:
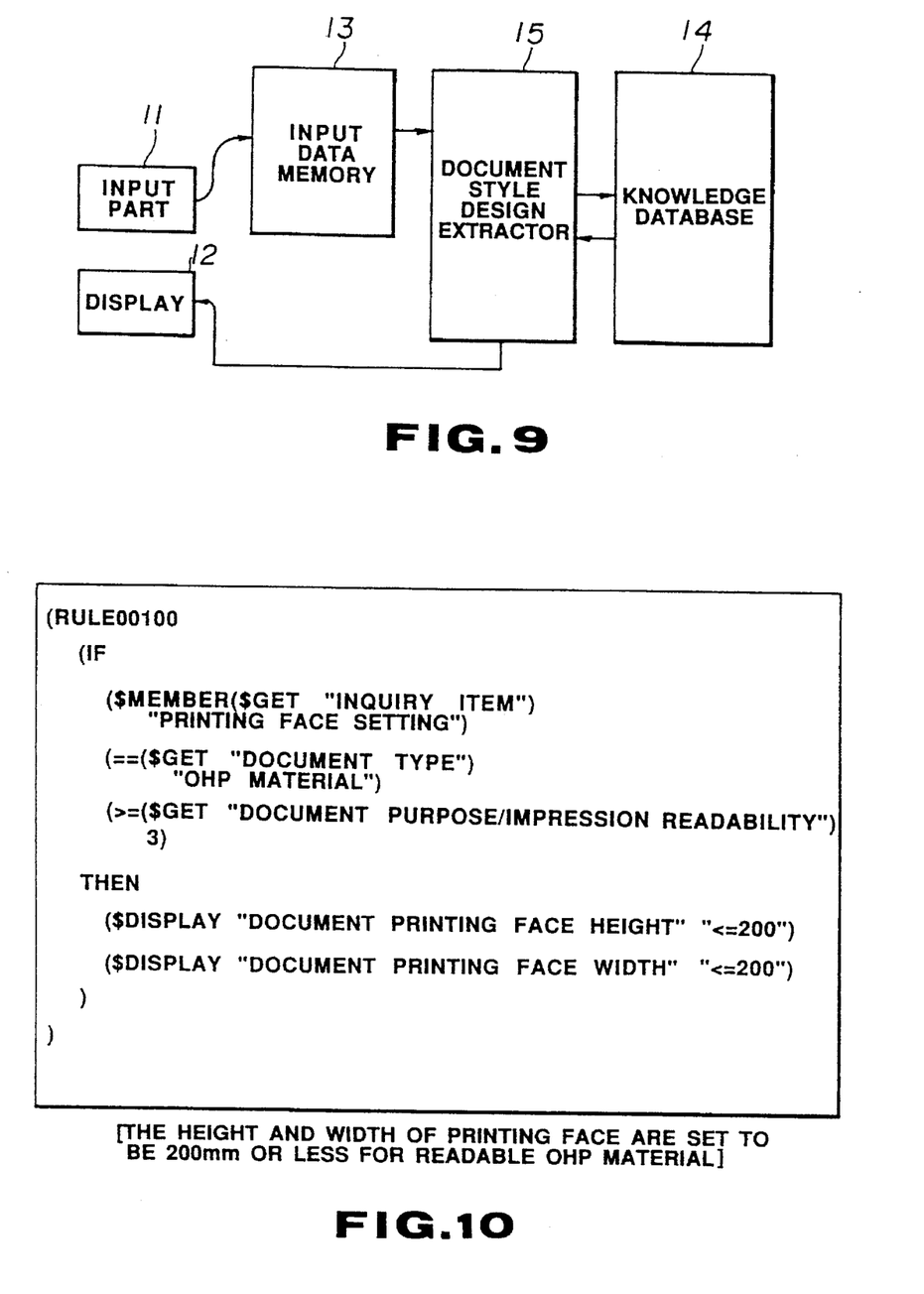
FIG. 9 is a block diagram of a document style design support system in accordance with a first embodiment of a second invention.
FIG. 10 is an example of a knowledge representation in a knowledge database.

FIG. 9 shows a block diagram of a document style design support system of a first embodiment of the second invention. The document style design support system of FIG. 9 includes an input part 11, a display 12, an input data memory 13, a knowledge database 14 and a document style design method extractor 15.

The input part 11, which comprises, for example, a keyboard, a mouse, a joy-stick or a touchpanel, is used to enter various sorts of data or commands.

The display 12, which comprises, for example, a display unit, is used to display thereon characters, figures, messages or the like. The display 12 may comprise such a printing device as a printer.

The input data memory 13, which comprises, for example, a magnetic disk device or a main memory, stores therein data entered from the input part 11. The data of the input data memory 13 are held on the above magnetic disk device or the main memory in accessible state to provide data in response to a user's inquiry. For example, when the user wishes to know the degree of a preference to the "formality" entered by the user, an inquiry of "document purpose/impression formality" results in acquisition of "3" out of 5 levels of formality. When the user wishes to know the type of a document being prepared, an inquiry of "document. type" results in acquisition of data "OHP material". Further, when the user fails to specify specifically, e.g., the degree of preference to "formality" or when he fails to specify specifically the type of the associated document, the respective inquiries result in that such a predetermined special value as "nil" is returned.

The knowledge database 14, which comprises a magnetic disk device or an optical disk device, stores therein evaluation words indicative of the purpose/impression of a document, document style design elements as document structure parameters including paper size, printing face size and character size, document attributes such as document type, purpose and finish impression, and document style design data knowledge for prescribing relationships between these evaluation words, document design elements and document attributes, by such a knowledge representation method as an "IF-THEN" rule type or a frame type.

The document style design method extractor 15, on the basis of the data stored in the input data memory 13, extracts a document style design method while performing inferring operation with use of the data of the knowledge database 14. The document style design method extractor 15 comprises such an inference engine as to perform forward or backward reasoning or inference.

Figure 11:
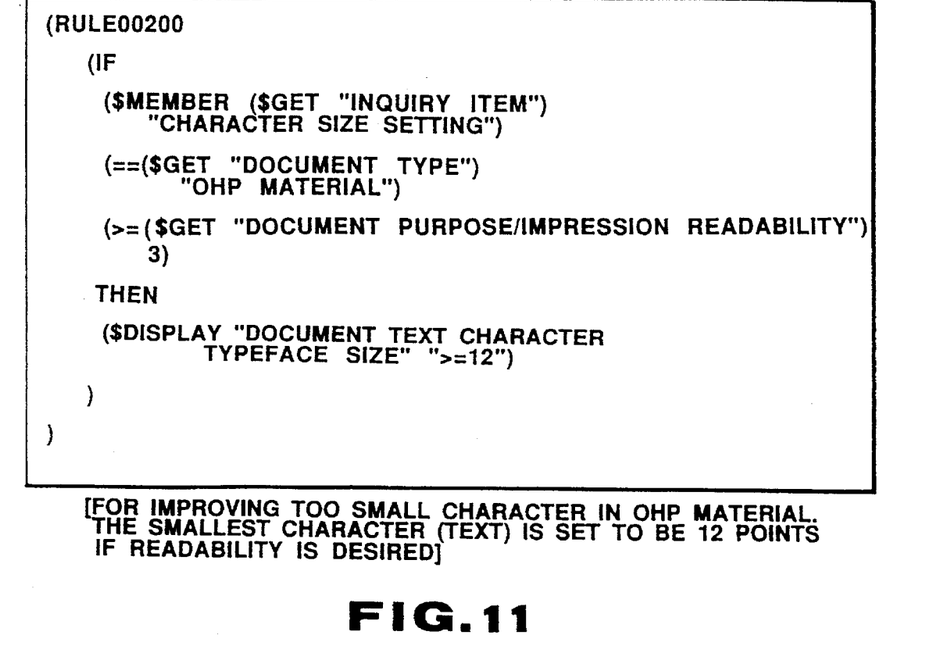
FIG. 11 is another example of the knowledge representation in the knowledge database.

For details of the knowledge representation of a general knowledge database and the arrangement of the inference engine, refer to, for example, the book entitled "Building Expert System", written by F. Hayes-Roth, et al., Addison-Wesley, 1983. In this connection, the knowledge on the document style design methods refer to various sorts of knowledge including qualitative or quantitative data and data indicative of in-house instructions in a company or office, as stated in a book entitled "Layout Dictionary 1" compiled by Hiroyuki Uchida, Visual Design Lab., 1984 or in the book entitled "Presentation & Documentation", compiled by Fuji Xerox, Fuji Xerox, 1989. More concretely, for example, a knowledge of "the height and width of printing face are set to be 200 mm or less for readable OHP materials" is expressed in such a format as shown in FIG. 10, and a knowledge of "character size is set to be 12 points or more for readable OHP materials" is expressed in such a format as shown in FIG. 11.

The operational procedure of the inference engine in the document style design method extractor 15 is based on the flowchart of FIG. 4. More in detail, the document style design method extractor 15, when receiving an inference start command, first extracts from the knowledge database 14 all the rules written in the IF-THEN format, and finds ones of the extracted rules whose IF conditional parts become all true based on the data of the input data memory 13, under the operation of the inference engine. The document style design method extractor 15 then selects only one of the found rules whose IF conditional parts becomes all true and executes the execution contents written in the THEN execution part of the selected rule. These rule selection and execution are repeated until an inference stop command for the THEN execution part is issued or a rule to be selected becomes nil. In this way, the document style design method extractor 15 extracts a desired document style design method.

Explanation will then be made as to a specific example when the document preparation is actually supported through the aforementioned document style design support system.

Figure 12:
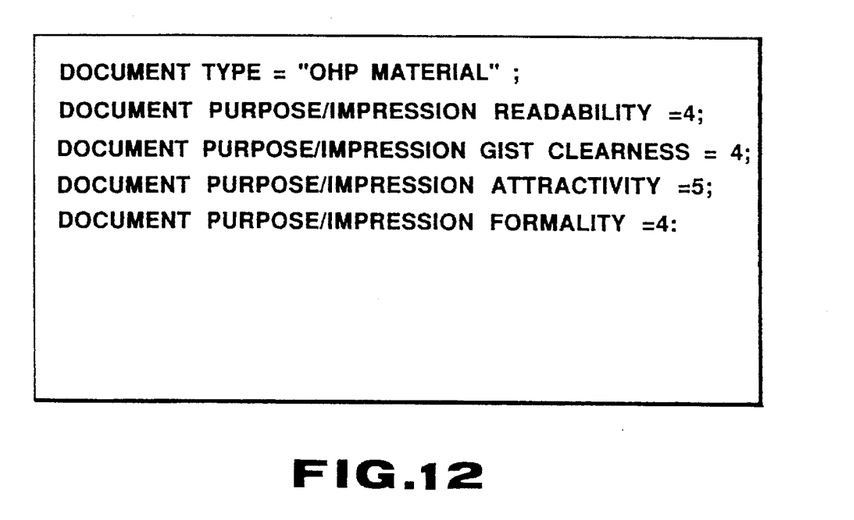
FIG. 12 is an example of data entered by a user.
Figure 13:
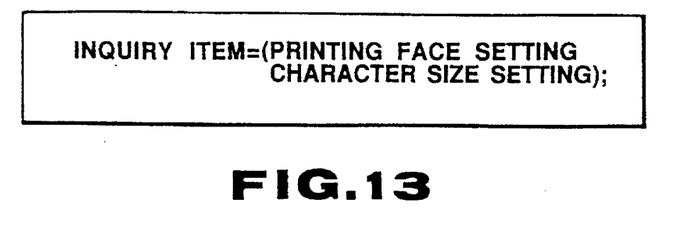
FIG. 13 is a display example of determined document style design parameters.

First, when a user inputs data as shown in FIG. 12 through the input part 11, the input data memory 13 stores therein such information indicative of "document type: OHP material", "document purpose/impression: readability: 4". Then, the user enters such data as shown in FIG. 13. This means that the user wishes to know the method associated with the settings of the printing face and character size of OHP (overhead projector) documents.

The document style design method extractor 15, when receiving a start indication, selects and executes such a rule as shown in FIG. 10 according to the aforementioned operational procedure to display a knowledge of "the height and width of printing face are set to the 200 mm or less respectively". This rule is selected in the input data memory 13 on the basis of the data "document type: OHP material" and "inquiry item: printing face setting" because the IF conditional part of the rule becomes true. This rule indicates that, when the printing face of the document as OHP material is too large, the character lines of the document to be printed might be truncated depending on the shape of a light source in an overhead projector (OHP), for which reason the printing face is set to be preferably 200 mm×200 mm or less. The document style design method extractor 15 further performs its rule selecting operation and selects and executes such a rule as shown in FIG. 11 to display a knowledge of "character size is set to be preferably 12 points or more". This rule indicates that, when small characters are used for the OHP material, the characters of the OHP material when actually projected become illegible because of the too small characters, for which reason the character size is set to be preferably 12 points or more. In this way, the document style design method extractor 15 sequentially indicates substantially all document style design methods, at which stage the inferring operation is completed.

Figure 14:
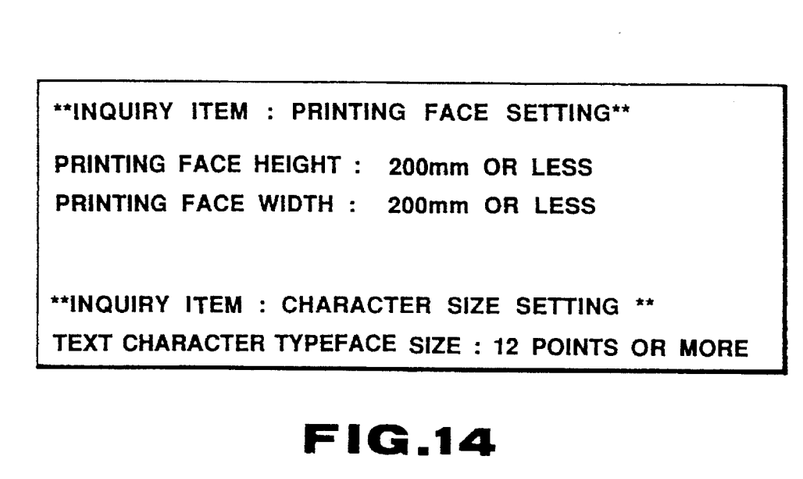
FIG. 14 shows a display example of a document style design technique.

The document design style methods thus obtained are displayed on the display 12 in such a format as shown in FIG. 14 and the system user can edit the document according to the displayed document style design method.

Figure 15:
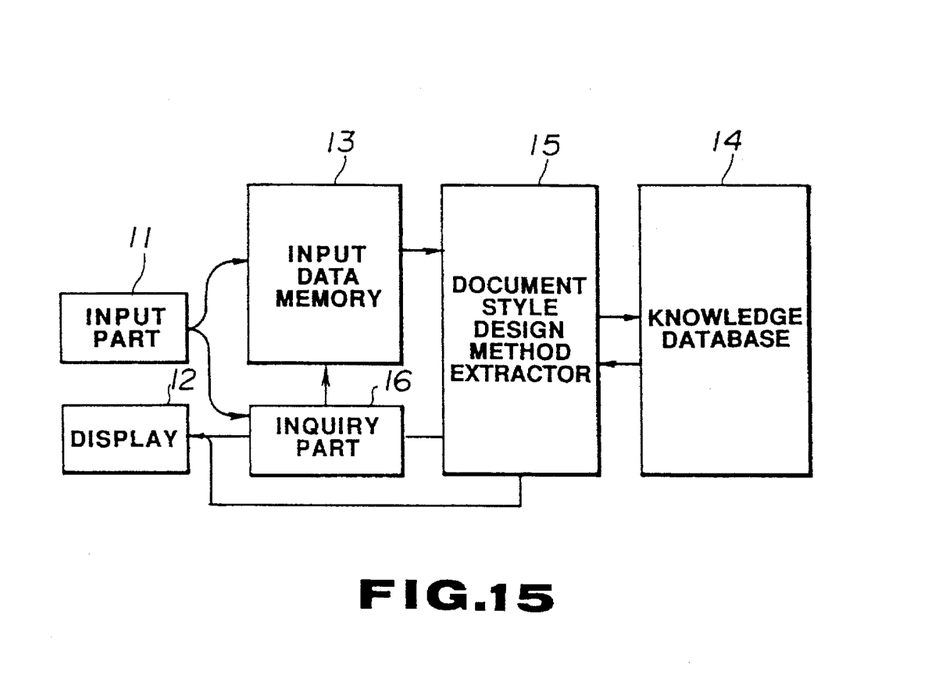
FIG. 15 is a block diagram of a document style design support system in accordance with a second embodiment of the second invention.

Next, a second embodiment of the second invention will be explained. Shown in FIG. 15 is a block diagram of a document style design support system in accordance with the second embodiment of the second invention. The document style design support system of FIG. 15 includes, in addition to the arrangement of FIG. 9, an inquiry part 16 having means (not shown) for displaying the missing data necessary in the document style design method extractor 15 on the display 12 in a question sentence form and means (not shown) for receiving its response from the input part 11 and for adding it to the input data memory 13.

In the present embodiment, if an inquiry "document type" for example is issued to the input data memory 13 and the associated data is not held in the input data memory 13, then such a special value as "nil" is returned from the input data memory 13 to the document style design method extractor 15. And the document style design method extractor 15, when receiving the value "nil" from the input data memory 13, once stops its processing operation, moves the control to the inquiry part 16 to ask the user to enter the value in the input data memory 13, and again returns the control to the document style design method extractor 15 to resume the operation. In this way, the document style design method extractor 15, when failing to find attribute data necessary for the extraction of the document style design method, informs the inquiry part 16 of the missing attribute data and displays it on the display 12, through which the user can know the missing data. When the user enters the missing attribute data looking at it on the display screen, a desired document style design method can be attained.

Figure 16:
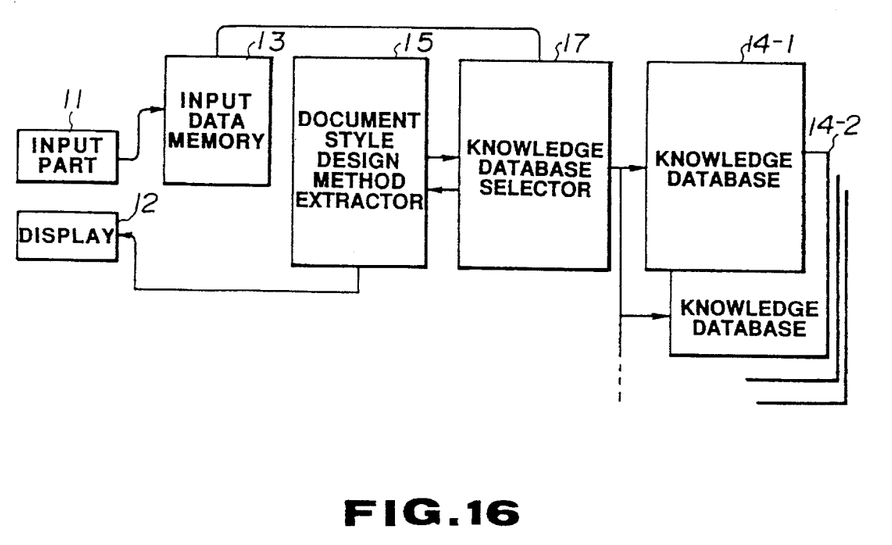
FIG. 16 is a block diagram of a document style design support system in accordance with a third embodiment of the second invention.

Next, a third embodiment of the second invention will be explained. Referring to FIG. 16, there is shown a block diagram of a document style design support system in accordance with the third embodiment of the second invention. In the present document style design support system, the knowledge database 14 shown in the foregoing first and second embodiments of the second invention is made up of a plurality of sub-databases 14-1, 14- 2, . . . corresponding to the type, associated person, etc. of documents. Further stored in the input data memory 13 are data for selection of one of the plurality of knowledge databases. A knowledge database selector 17 for selecting one of the plurality of databases 14-1, 14-2, . . . according to the data of the input data memory 13 is further provided. Although the arrangement of FIG. 16 is based on the arrangement of FIG. 9, the arrangement of FIG. 16 may be similarly based on the arrangement of FIG. 15.

Reference has been made to the single database in the foregoing first and second embodiments of the second invention. In the present document style design support system, however, the knowledge database selector 17 selects associated one from the plurality of knowledge databases according to the attribute data of, e.g., "the reader is an old person" to retrieve the associated knowledge database. With such an arrangement, finer knowledge can be retrieved in a shorter time and thus the supporting effect can be enhanced. Further, since the knowledge database is divided into the plurality of sub-databases, specific one or ones of the plurality of sub-databases can be mounted on another system in some applications, whereby the database requiring a lot of labor and cost for its preparation and maintenance can be efficiently utilized.

As has been explained in the forgoing, the document style design support systems of the first invention have an advantage that, since inference is carried out with use of document style design knowledge data including such document data as evaluation words and attributes of documents and such document style design elements to determine the optimum document style design, the system user can easily obtain a design on a good-looking document meeting his purpose and application while eliminating the need for having any editorial design knowledge.

Further, the document style design support systems of the second invention have an advantage that, since inference is carried out with use of document style design knowledge data including such document data as the evaluation words and attributes of documents and document style design methods to extract the optimum document style design method, even when the system user has no knowledge about the document style design, he can easily design a document style having a good result and satisfying his purpose and application.

What is claimed is:

1. A document style design support system adapted for outputting an acceptable document style design of a document to be prepared and supported based on document attributes to satisfy a user's intention and purpose, comprising:

document style design knowledge;

input means for inputting evaluation indexes which represent a rating system pertaining to a user's desired document attributes of a particular document to be designed and supported;

a knowledge database for storing therein ratings setting forth both a scale of and correlation among each of the document attributes, evaluation indexes, document design elements constituting the document style design, by using said document style design knowledge;

document style design deciding means for performing an inferring process on the basis of both the desired document attributes and the evaluation indexes input through the input means and the rules of the knowledge database to decide a desired document style design; and output means for outputting the document style design decided by the document style design deciding means.

2. A document style design support system as set forth in claim 1, wherein the evauation indexes includes parameters of readability, clarity, impression and formality.

3. A document style design support system as set forth in claim 1, wherein the document style design deciding means decides a target style selected from the group consisting of paper size, paper orientation, document margin, character size, typeface, offset, line pitch and column number, for an entire document or a part of the document.

4. A document style design support system as set forth in claim 1, wherein the document style design deciding means decides the target style to be based on the color scheme of an entire document or composition elements of the document.

5. A document style design support system as set forth in claim 1, further comprising display means and second input means, wherein the display means indicates the data required to be input to perform the inferring process by the document style design deciding means, and wherein the second input means inputs the required data necessary in the document style design deciding means on the basis of the indication by the display means.

6. A document style design support system as set forth in claim 1, further comprising at least one or more second knowledge database selector means, wherein the database selector means selects one of the second knowledge database.

7. A document style design support system adapted for outputting an acceptable document style design document to be prepared and supported that satisfies a user's intention and purpose comprising:

document style design knowledge;

input means for inputting evaluation indexes which represent a user's requests for document attributes selected from a list of document attributes to be designed and supported and preset abstract categories in a document design;

a knowledge database for storing therein rules prescribing elements of document design including the document attributes, the evaluation indexes, document design elements constituting the document style design, and correlation among said elements, by using said document style design knowledge;

document style design deciding means for performing an inferring process on the basis of the document attributes and/or the evaluation indexes input through the input means and the rules of the knowledge database to decide a document style design conforming to the user's requests; and output means for outputting the document style design decided by the document style design deciding means.

8. A document style design support system as set forth in claim 7, wherein the evaluation indexes includes parameter of readability, clarity, impression and formality.

9. A document style design support system as set forth in claim 7, wherein the document style design deciding means decides a target style design to be selected from the group consisting of paper size, paper orientation, document margin, character size, typeface, offset, line pitch and column number, for an entire document or a part of the document.

10. A document style design support system as set forth in claim 7, further comprising display means and second input means, wherein the display means indicates the data necessary to be input to perform the inferring process by the document style design deciding means, and wherein the second input means inputs the data necessary in the document style design deciding means on the basis of the indication by the display means.

11. A document style design support system as set forth in claim 7, further comprising at least one or more second knowledge database and database selector means, wherein the database selector means selects one of the second knowledge database.

* * * * *